United States Patent
Musumeci

(10) Patent No.: US 6,920,530 B2
(45) Date of Patent: Jul. 19, 2005

(54) SCHEME FOR REORDERING INSTRUCTIONS VIA AN INSTRUCTION CACHING MECHANISM

(75) Inventor: Gian-Paolo D. Musumeci, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 446 days.

(21) Appl. No.: 10/131,524

(22) Filed: Apr. 23, 2002

(65) Prior Publication Data

US 2003/0200396 A1 Oct. 23, 2003

(51) Int. Cl.[7] ............................ G06F 12/08; G06F 9/06
(52) U.S. Cl. ........................ 711/125; 711/137; 712/245
(58) Field of Search .............................. 711/121, 125, 711/137, 165, 170; 712/207, 245; 717/154, 158

(56) References Cited

U.S. PATENT DOCUMENTS 5,623,608 A  *  4/1997  Ng ............................ 711/137

5,950,009 A  *  9/1999  Bortnikov et al. ........... 717/158

* cited by examiner

Primary Examiner—Gary Portka

(57) ABSTRACT

A method and system for storing instructions retrieved from memory in a memory cache to provide said instructions to a processor. First a new instruction is received from the memory. The system then determines whether the new instruction is a start of a basic block of instructions. If the new instruction is the start of a basic block of instructions, the system determines whether the basic block of instructions is stored in the memory cache responsive. If the basic block of instructions is not stored in the memory cache, the system retrieves the basic block of instructions for the new instruction from the memory. The system then stores the basic block of instructions in a buffer. The system then predicts a next basic block of instructions needed by the processor from the basic block of instructions. The system determines whether the next block of instructions is stored in the cache memory and retrieves the next basic block of instructions from the memory if the next block of instructions is not stored in memory.

14 Claims, 6 Drawing Sheets

SCHEME FOR REORDERING INSTRUCTIONS VIA AN INSTRUCTION CACHING MECHANISM

BACKGROUND OF THE INVENTION

1. Field of the Invention

This invention relates to a memory cache that stores instructions received from a memory and provides the instructions to a processing unit. More particularly, this invention relates to reading blocks of instructions from memory and reordering the block of instructions to provide the instructions in an optimal order to the processing unit.

2. Prior Art

In many computer systems, it is common to have a memory cache for providing instructions from a memory to a processing unit. A memory cache is a memory that stores instructions from a main memory that may be frequently reused. There are two principles which make a memory cache effective. The first principle is temporal locality which means that if one piece of data or instructions is accessed, similar data or instructions are likely to be accessed soon. The second principle is spatial locality which means that if one piece of data or an instruction is accessed, pieces of data or instructions stored nearby are likely to be accessed soon.

The memory cache provides the stored instructions to the processing unit when the instructions are requested. This eliminates a need for an Input/Output ("I/O") event that requires additional time to retrieve the instruction from the memory that wastes processing time.

Typically, cache schemes for storing instructions are very simplistic to reduce the complexity of the circuitry needed to provide the cache. This is because performance of a cache is directly related to the complexity of the cache circuitry. In most cache systems a direct-mapped cache system is used. In a direct-mapped cache, lower bits of a physical address of an instruction or piece of data in memory used to store the instruction or data. For example, if a cache store 64 entries, instructions or pieces with data with physical addresses of A through A+64 are stored to the same entry as the instructions or pieces of data are received from memory.

Furthermore, there is no ordering of the instructions stored in the cache to provide the instructions in the likely order that the instructions will be executed by the processor. This slows retrieval of instructions from the cache, as a cache controller must make repeated searches for sequential instructions.

A more complex method for storing instructions is trace caching. In trace caching additional circuitry is added to store recently executed instructions in a buffer to provide these executed instructions quickly to the cache. Although this method greatly increases the speed at which instructions are provided, the additional circuitry increases the complexity of the cache circuitry which in turn increases the cost of the circuitry. A trace cache utilizes a special form of spatial locality. The instructions executed by a micro processor can be broken into logical structures called "Basic Blocks." For purposes of this discussion, a basic block is a sequence of instructions that are a complete sequence that must be completed after a first instruction is executed. A trace cache uses additional circuitry to store entire blocks rather than individual instructions. This increases the efficiency of the block because the processor has to make fewer accesses to main memory to retrieve instructions in the block as execution of the block is performed.

As clock rates of processing units increase, it becomes more of a problem to design storage schemes for memory caches that quickly provide instructions to the processing unit to reduce wasted clock cycles while waiting for information to be retrieved from main memory. For purposes of the present discussion, main memory is the Random Access Memory or disk storage of a computer system. Furthermore, the complexity of the circuitry required to optimally order instructions in a microprocessor pipeline greatly increases. Therefore, those skilled in the art are constantly trying to improve the methods of storing instructions in the cache to provide instructions to the processing unit without adding additional circuitry to the critical path of the microprocessor.

BRIEF DESCRIPTION OF THE INVENTION

The above and other problems are solved and an advance in the art is provided by a method and apparatus for reordering instructions in an instruction caching device in accordance with this invention. This invention reduces the complexity of the microprocessor pipeline by eliminating scheduling units, creating a simplified microprocessor that approaches one designed with a Very Long Instruction Word (VLIW) architecture in mind. This invention both improves the efficiency of the cache at providing the microprocessor with instructions as well as reducing the complexity in the microprocessor, potentially enabling faster cycle times. This invention also reduces performance degradation of software compiled with older compilers.

In accordance with this invention, the cache memory includes a control circuitry, a memory buffer for receiving and temporarily storing blocks of instructions, and a memory for storing instructions. The control circuitry is configured to provide the following method for storing received instructions in the memory of the cache. The process begins when a new instruction is received by the memory cache from the main memory on the request of the microprocessor. The control circuitry of the cache determines whether the new instruction is a start of a basic block of instructions for the processing unit to execute. This may require assistance from a compiler to be optimally completed.

If the new instruction is a start of a basic block of instructions, the control circuitry of the cache memory determines whether the basic block of instructions of the new instruction is stored in the memory of the cache. If the basic block of instructions is not stored in the memory of the cache, the control circuitry retrieves the rest of the basic block of instructions from the main memory. The entire block of instructions is then stored in the memory of the cache.

The control circuitry then determines whether the instruction block has previously been stored in the cache. If the instructions have previously been stored in the cache, the control circuitry then predicts the next basic block of instructions the processing unit may need and determines if the next basic block of instructions is stored in the memory of the cache. The control circuitry must have observed the instruction block being executed before the prediction can be made because most prediction mechanisms rely on using behavior for branch prediction. If the next basic block of instructions is not stored in the memory of the cache, the next block of instructions is retrieved from main memory.

When the basic block of instructions is already stored in the memory cache, the memory cache halts reading of instructions in the basic block of instructions from the main memory.

The cache may periodically reorder the basic blocks of instructions stored in the memory of cache into an optimal sequence. This optimal sequence may be dependent on the specific hardware implementation of the microprocessor. The reordering may be performed in the following manner. The control circuitry detects that the sequence of a stored basic block of instructions is not optimized. The basic block of instructions is copied into a reordering buffer. A reordering process is then executed on the basic block of instructions in the reordering buffer.

The control circuitry then stores the reordered basic block of instructions into the memory of the cache. To store the reordered basic block, the control circuitry may determine an optimal spatial location in the memory of the cache for the reordered basic block of instructions and store the block to this location. This is done to encourage data in the cache to remain unfragmented. A cache index in the control circuitry is then updated to indicate the location of the reordered instruction block in the memory of the cache.

When a new instruction received by the memory cache is not a start of a block of basic instructions, the instruction is stored in the memory of the cache in a conventional manner.

DETAILED DESCRIPTION OF THE INVENTION

The following description of preferred embodiments of this invention is not intended to limit the scope of the invention to these preferred embodiments, but rather to enable any person skilled in the art to make and use the invention.

As any person skilled in the art of will recognize from the previous description and from the figures and claims, modifications and changes can be made to the preferred embodiments of the invention without departing from the scope of the invention defined in the following claims.

Figure 1:
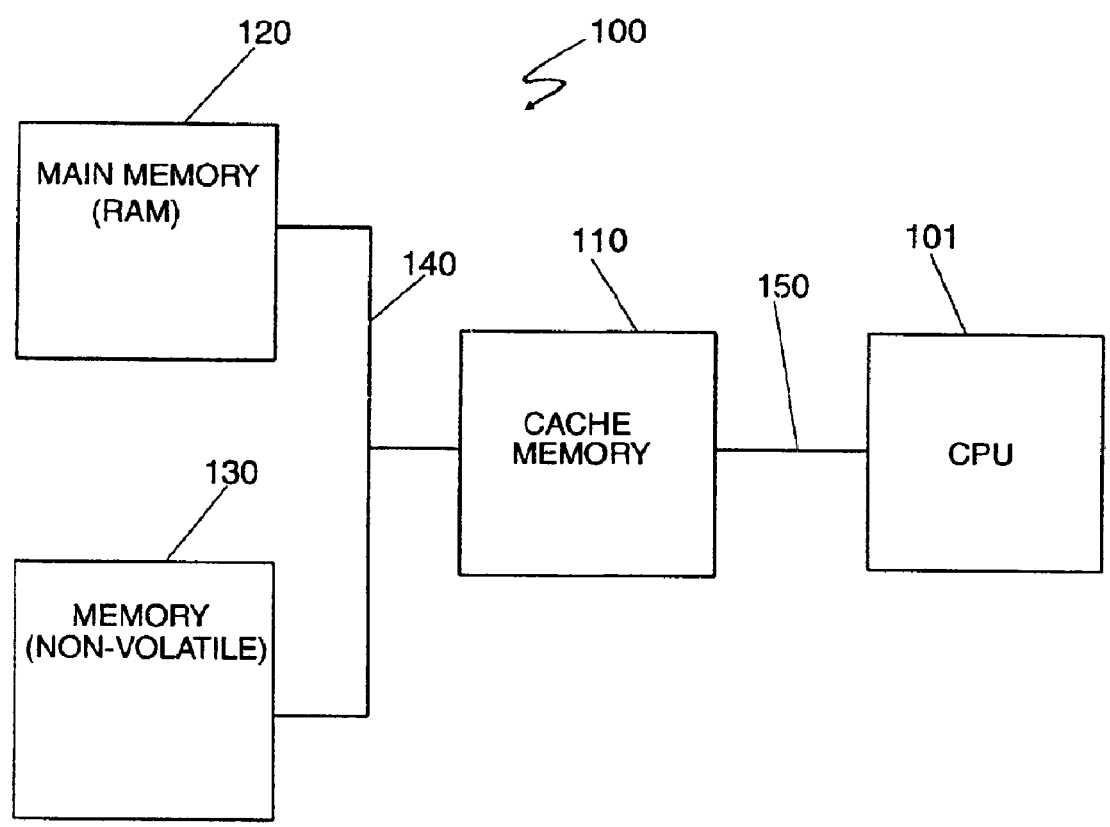
FIG. 1 is a block diagram of components of a processing system having a memory cache in accordance with this invention.

FIG. 1 illustrates an exemplary embodiment of a processing system 100 having a cache memory in accordance with this invention. For purposes of this discussion, a processing system is a computer or other system having a processing unit that executes instructions stored in a memory readable by the processing unit to provide applications. One skilled in the art will also recognize that systems that do not relate to this invention are omitted for brevity and clarity of discussion of this invention.

Processing system 100 has a Central Processing Unit (CPU) 101. CPU 101 may be a processor, microprocessor or group of processors and/or microprocessors which perform instructions stored in an associated memories to perform the applications provided by processing system 100.

Path 150 connects cache memory 110 to CPU 101. Cache memory 110 provides instructions and data to CPU 101. The instructions may be retrieved from memory or may be stored in cache memory 110. Instructions and data that were recently requested by CPU 101 are stored in cache memory 110. This allows the instructions stored in cache memory 110 to be transmitted to CPU 101 faster than reading the instructions from memory. One skilled in the art will recognize that cache memory 110 may be separated into a level 1 and a level 2 cache. Furthermore, Cache memory 110 may also be divided into an instruction cache and a data cache. The methods presented in accordance with this invention may be used in any division of cache memory 110 that stores instructions for CPU 101. However, it is envisioned that these methods are preferably used by a level 1 instruction cache.

Bus 140 connects CPU 101 and cache memory 110 to main memory 120 and non-volatile memory 130. Preferably, main memory 120 is a Random Access Memory (RAM) or other volatile memory for storing data and instructions for applications currently being executed by a CPU 101. Non-volatile memory 130 is a static memory such as a disk that stores data and instructions for future use. One skilled in the art will recognize that more than one type of non-volatile memory may be connected in processing system 100 and nonvolatile memory may be connected to CPU 101 via another bus.

Figure 2:
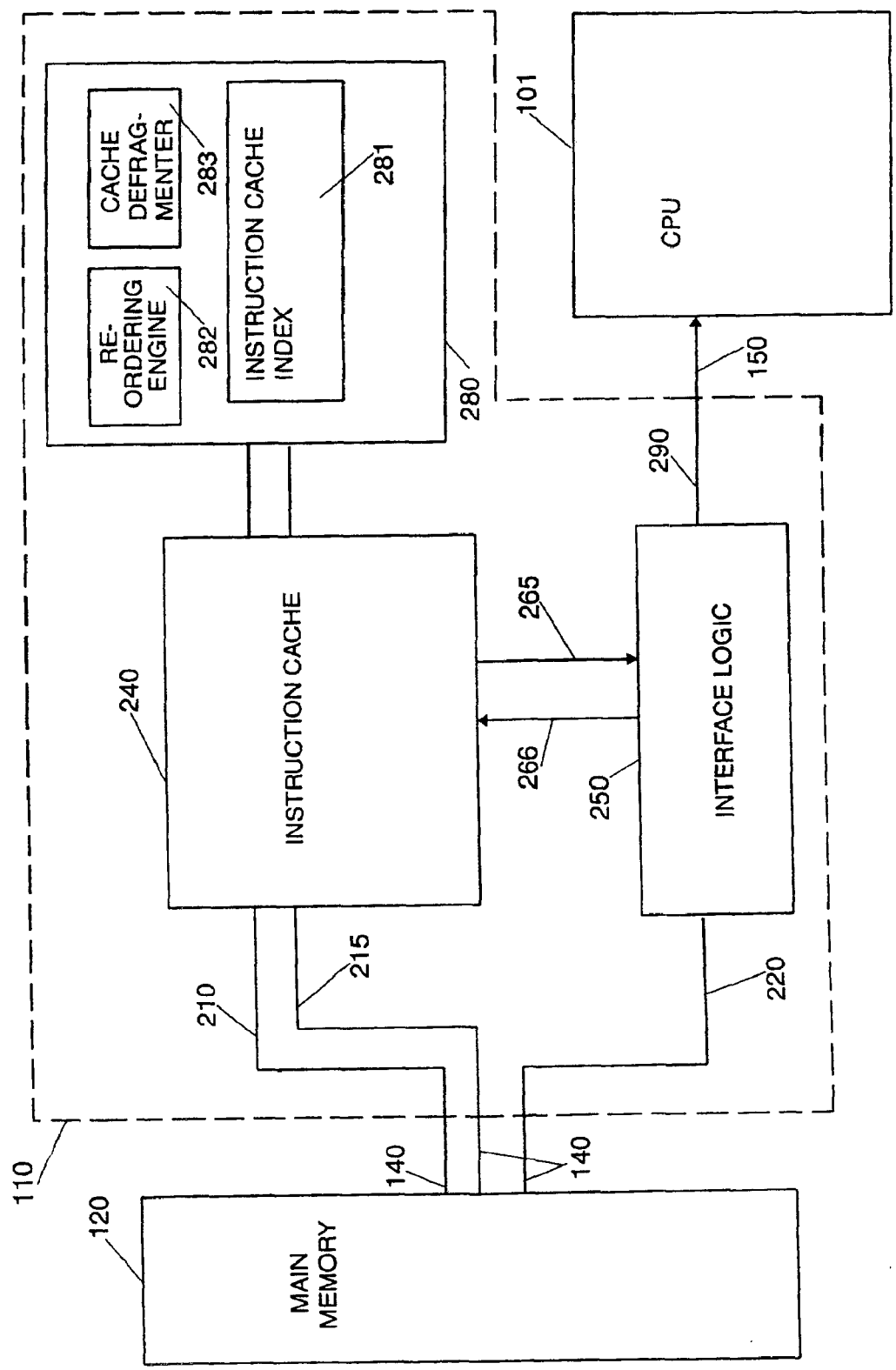
FIG. 2 is a block diagram of a memory cache in accordance with this invention.

FIG. 2 illustrates a more detailed diagram of cache memory 110. Cache memory 110 includes instruction cache 240, Instruction fetch (IF) logic 250, and cache control circuitry 280. Instruction cache 240 is a memory such as a Static Random Access Memory (SRAM) that stores instructions received by CPU 110. IF logic 250 is the circuitry that provides instructions read from memory and instruction cache 240 to CPU 110. Cache control circuitry 280 maintains the instructions stored instruction cache 240.

Instruction cache 240 receives instructions from main memory 120 via path 210 and transmits instructions back to main memory 120 via path 215. One skilled in the art will recognize those paths 210 and 214 may be over the same path or bus 140. Cache control circuitry 280 receives data from instruction cache 240 via path 270 and transmits data to instruction cache 240 via path 275. One skilled in the art will recognize those paths 270 and 275 may be over a common bus or lines connecting instruction cache 240 to control circuitry 280. Instruction cache receives instructions from IF logic 240 via path 260 and provides instructions to IF logic 240 via path 265.

IF logic 250 receives instructions from main memory via path 220. One skilled in the art will recognize that path 220 may be attached to the bus providing paths 210 and 215 to instruction cache 240. CPU receives instructions from IF logic via path 150.

Cache control circuitry 280 includes reordering engine 282, cache defragmenter 283, and instruction cache index 281. Reordering engine 282 performs the reordering routine described below. Cache defragmenter 283 defragments instruction cache 240 to provide more space for storing contiguous blocks of instructions. One skilled in the art will recognize that reordering engine 282 and cache defragmenter 283 may be provided as hardware, firmware, or software executed by a microprocessor. Instruction cache index 281 is a memory storing a list of addresses of memory address stored in instruction cache 240 and pointer to locations of the instructions in the cache.

Figure 3:
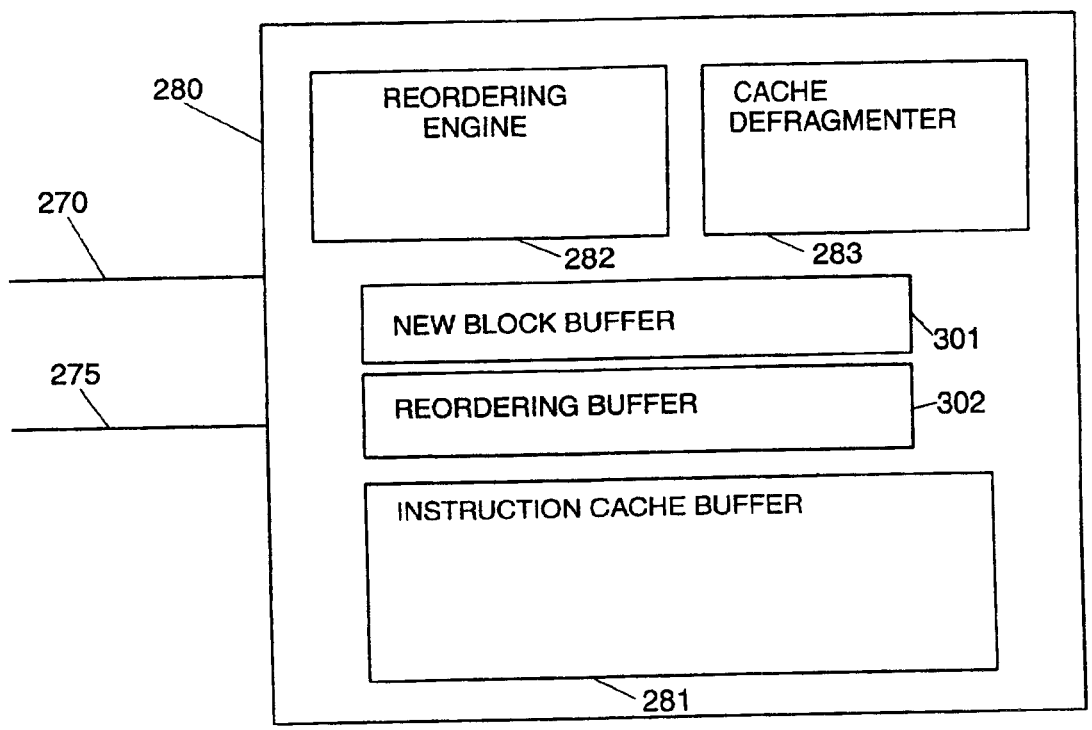
FIG. 3 is a block diagram of control circuitry in accordance with this invention.

FIG. 3 provides a more detailed block diagram of cache control circuitry 280 in accordance with this invention.

Cache control circuitry 280 includes reordering engine 282, cache defragmenter 283, instruction cache index 281, new block buffer 301, and reordering buffer 302. Reordering engine 282 performs the reordering routine described below. Cache defragmenter 283 defragments instruction cache 240 to provide more contiguous space for storing blocks of instructions. Instruction cache buffer 281 maintains a list of instructions stored in instruction cache 240. New block buffer 301 is a memory that can hold a basic block of instructions received from main memory and is used to store a basic block of instructions until stored in instruction cache 240. Reorder buffer 302 is a memory that is sized to hold a basic block of instructions and is used by reordering engine 282 to perform the reordering described below. One skilled in the art will recognize the cache control circuitry may be software or firmware executed by a microprocessor and associated memory or hardware such as integrate circuits.

Figure 4:
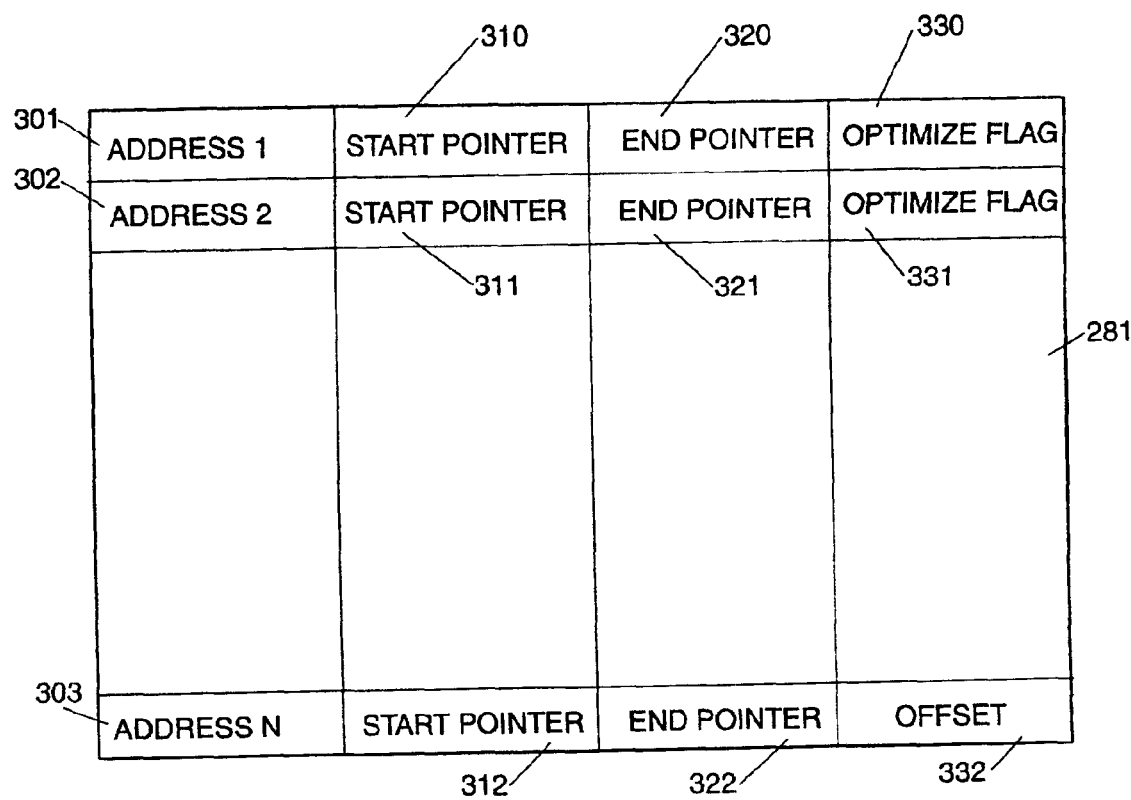
FIG. 4 is a block diagram of a cache index in accordance with this invention.

FIG. 4 illustrates a cache memory index 281 in accordance with this invention. Cache memory index 280 is a memory, such as a RAM or other volatile memory, which stores a list of instruction blocks stored in memory cache 240. Cache index contains an entry for each instruction block stored in the cache. Each instruction is identified by an address 301–303 of the instruction in main memory. For each address 301–303, the cache includes a start pointer 310–312, identifying the starting address of the instruction block in memory cache 240. Cache memory index 280 also includes an end pointer 320–323 to the last address in cache memory 240 of the instruction block. One skilled in the art will appreciate that the end pointer may be replaced with a block length. The only requirement being that start and end points are demarcated in cache memory index 281 For each address 301–303, cache memory index 281 also includes an optimized flag which indicates whether reordering engine 283 has reordered the block into an optimal sequence. One skilled in the art will recognize that cache index 281 may include many different fields for each address 301–330. These fields may be used by cache memory control circuitry 280 to maintain cache memory 240.

Figure 5:
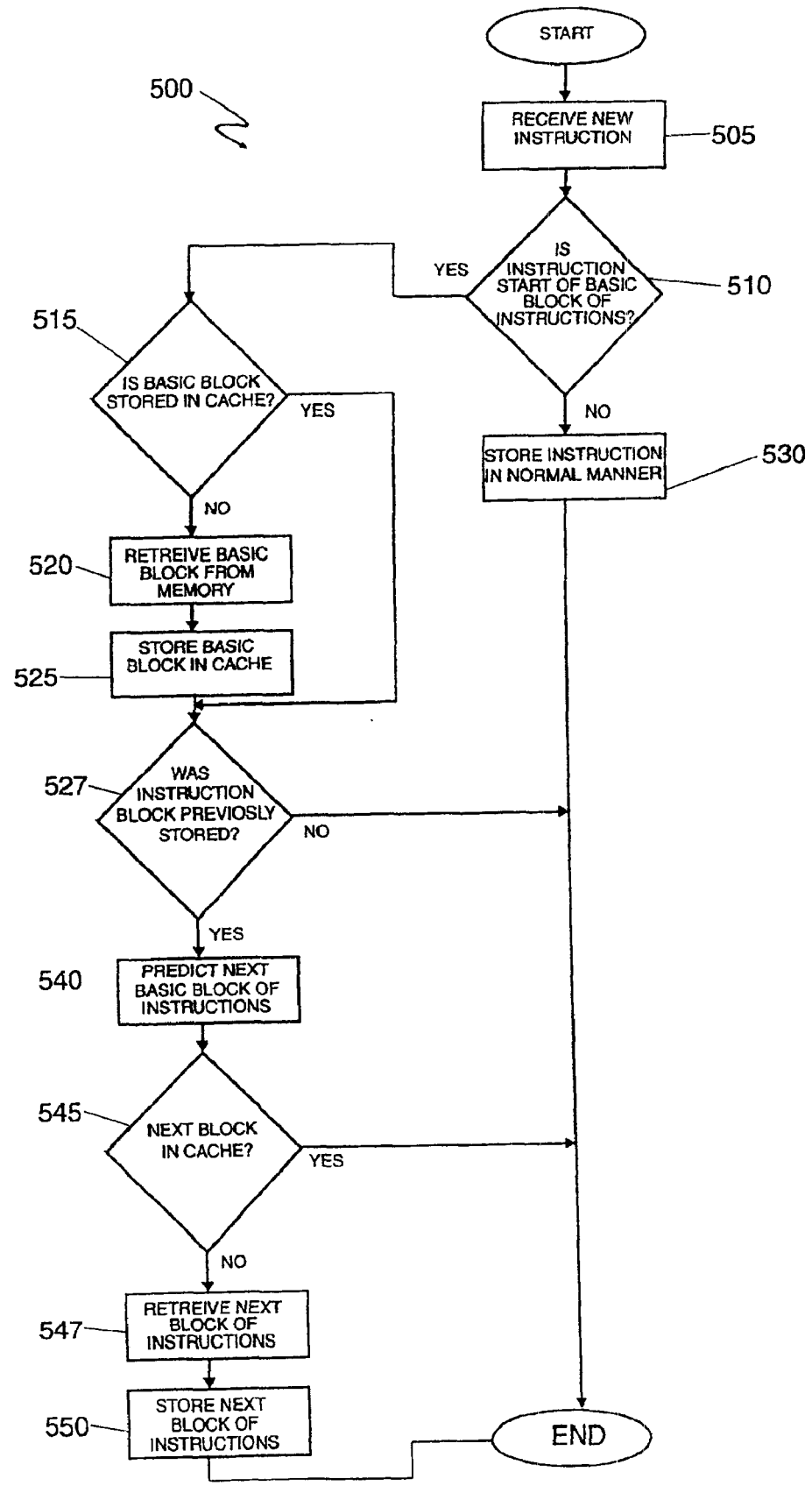
FIG. 5 is a flow chart of a method for receiving instructions into a memory cache in accordance with this invention.
Figure 6:
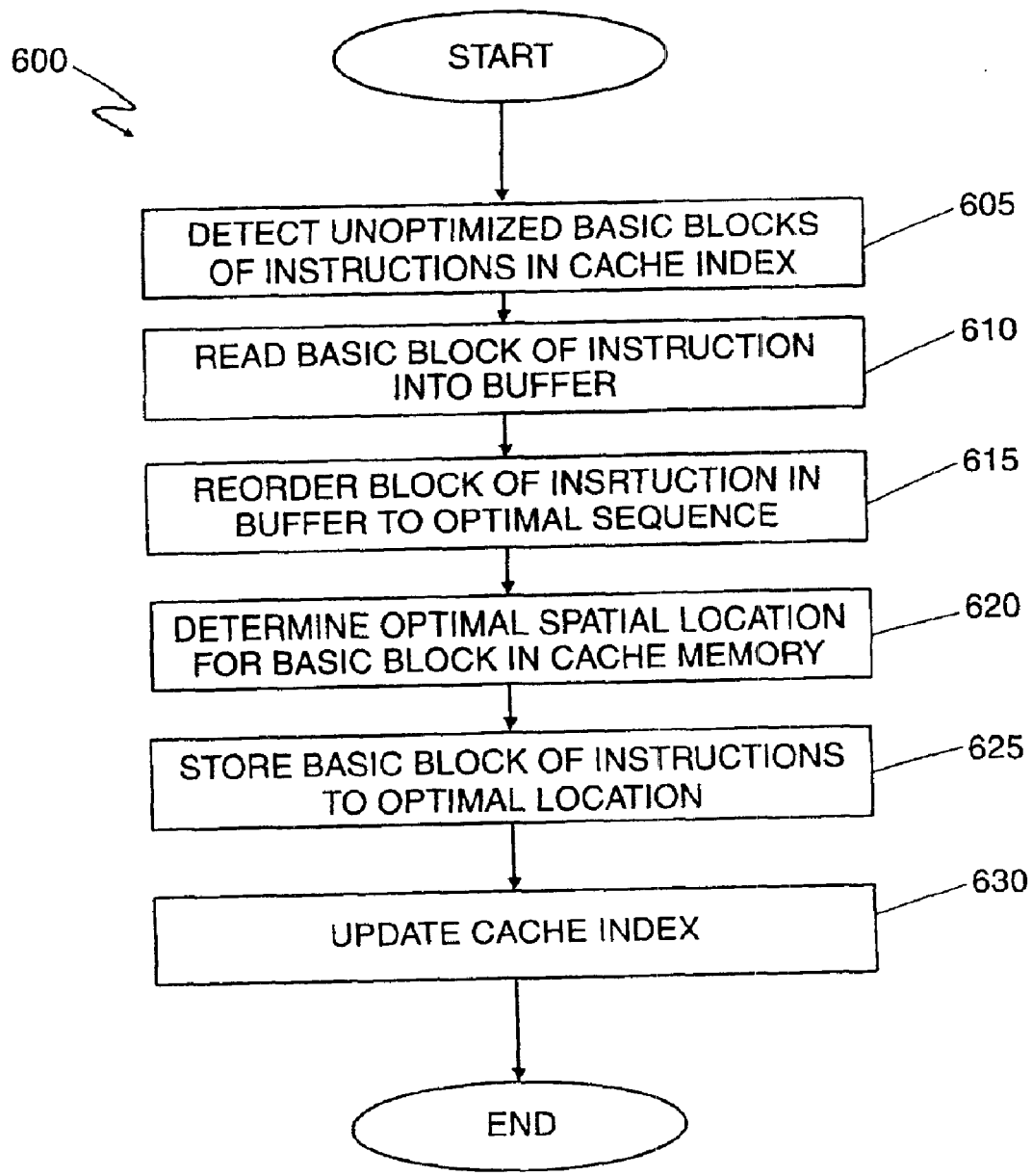
FIG. 6 is a flow diagram of a method for reordering instructions block in accordance with this invention.

In accordance with this invention, cache control circuitry executes the preferred embodiments of processes described in FIGS. 5 and 6 to provide instruction block retrieval and reordering in accordance with this invention. In accordance with this invention, the memory cache fetches basic blocks of instructions and stores the basic blocks in memory cache. The basic blocks of instructions are also reordered into an optimal sequence for provision to a processing unit. This increases the speed at which the blocks may be transmitted to the processing unit as the instructions block may be transferred in order without the need of many retrievals from the cache.

FIG. 5 illustrates a block diagram of a flow chart of a process 500 for retrieving instructions blocks into memory cache 240. Process 500 begins in step 505 with a new instruction being received by memory cache 240. Cache control circuitry 280 determines whether the new instruction is a start of a basic block of instructions in step 510. In a preferred embodiment, a compiler determines whether the new instruction is a beginning of the block from instructions read by the compiler. If the new instruction is not a start of a basic block of instructions, the instruction in processed in a conventional manner in step 550.

If the new instruction is a start of the basic block of instructions, the control circuitry determines whether the basic block of instructions is stored in memory cache 240 in step 515. If the basic block of instructions for the new instruction are not stored in memory cache 240, the basic block of instructions is retrieved from main memory in step 520. In step 525, the basic block of instructions retrieved in step 520 is stored in instruction cache 240. If the basic block is stored in memory cache or after retrieval of the basic block, control circuitry determines whether the instruction block has previously been stored in the cache in step 522. The control circuitry must have already observed execution of the block of instructions to predict the next instruction block as most prediction algorithms rely on past behavior of the instructions. If the instruction block has previously been stored in the cache, the control circuitry predicts a next basic block of instructions that may be needed after the basic block of instructions is performed in step 540. One skilled in the will recognize that any branch prediction algorithm may be used and the precise algorithm is not important to this invention. In step 545, cache control circuitry 240 determines whether the predicted next block of instructions is stored in memory cache 240. If the predicted next basic block of instructions is not stored in the memory, the next basic block of instructions is retrieved from main memory in step 547 and stored in memory cache 240 in step 548. After the next basic block of instructions is stored in memory cache 240 or if the predicted next basic block of instructions determined to be stored in memory cache 240, process 500 ends.

Periodically, memory cache control circuitry searches memory cache 240 to detect basic blocks of instructions that are not reordered in an optimal sequence and to perform reordering on the basic blocks. FIG. 6 illustrates a flow diagram of a preferred embodiment of a process 600 for reordering blocks of instructions. Process 600 begins in step 605 with control circuitry 280 detects a basic block of instructions that has not been reordered into an optimal sequence. Preferably, the detection is performed by reading the optimized flag for each block of instructions in memory cache index 280. If the flag is not set, the block has not been reordered.

Responsive to detection of a block of instructions that has not been reordered, the basic block of instructions is read into reorder buffer 302 in step 610. In step 615, reordering engine 282 performs a reordering operation to reorder the basic block of instructions in reorder buffer 302 into an optimal sequence.

The following is an example of one method for optimizing an instruction block. One skilled in the art will recognize that the exact algorithm used to perform optimization is not important to this invention. In the example, there is a block of instructions B. The control circuitry builds a matrix of all dependencies of all the instructions in instruction block B. In a specific example, if instruction 3 uses register R4 and R8, then instruction 9 that uses R8 is dependent upon instruction 3. Further, if instruction J depends on instruction K, then entry [J,K] in the matrix is one. Depending on the specific microprocessor implementation, we know how many instructions can be executed at any given time. The matrix is then inspected and all instructions having a column value of zero are found. The zero means these instructions do not depend upon another instruction. The list of instructions having a zero value is then sorted by the sums of row values in the matrix. The instructions are then ordered by the number of instructions dependent upon each of the instructions. The reordered instruction block is now in reordering buffer 302.

In step 620, control circuitry 280 determines an optimal spatial location in memory cache 240 for storing the reordered basic block of instructions. Control circuitry 280 then stores the reordered basic block of instructions in the optimal spatial location in step 625.

Control circuitry 280 then updates instructions instruction cache index 281 to indicate new start and end pointers to the optimal spatial location and to change the optimization flag to indicate reordering has been performed.

Those skilled in the art will recognize that the above is a description of preferred embodiments of memory cache performing instruction block retrieval and reordering in accordance with this invention. It is envisioned that those skilled in the art can and will design alternative embodiments that infringe on this invention as set forth in the claims below wither literally or through the Doctrine of Equivalents.

What is claimed is:

1. A method for storing instructions retrieved from memory in a cache memory to provide said instructions to a processor, said method comprising the steps of:
   receiving a new instruction from a main memory;
   determining whether said new instruction is a start of a basic block of instructions;
   determining whether said basic block of instructions is stored in a cache memory;
   retrieving said basic block of instructions from said main memory if said basic block of instructions is not stored in said cache memory;
   storing said basic block of instructions in said cache memory;
   reordering said basic block of instructions by:
      storing said basic block of instructions into a reorder buffer from said cache memory;
      performing an optimizing sequence process on said basic block of instructions in said reorder buffer;
      determining an optimal spatial location in said cache memory for said reordered instruction block; and
      storing said reordered instruction block to said optimal spatial location of said cache memory;
   predicting, from said basic block of instructions, a next basic block of instructions;
   determining whether said next basic block of instructions is stored in said cache memory; and
   retrieving said next basic block of instructions from said main memory if said next basic block of instructions is not stored in said cache memory.

2. The method of claim 1 further comprising the step of:
   halting reading of instructions in said instruction block from said main memory if said instruction block is stored in said cache memory.

3. The method of claim 2 further comprising the step of:
   providing said instructions of said basic block of instructions to said processor from said instruction block stored in said cache memory after said halting.

4. The method of claim 1 further comprising, prior to said reordering, the steps of:
   searching said cache memory for an unoptimized basic block of instructions; and
   detecting that said basic block of instructions is unoptimized.

5. The method of claim 1 further comprising the step of:
   storing said new instruction in said cache memory if said new instruction is not a start of an instruction block.

6. The method of claim 1 further comprising the step of:
   prior to said step of predicting a next block of instructions, determining whether said block of instructions has previously been stored in said cache memory.

7. The method of claim 1, wherein said optimizing sequence process comprises:
   for each instruction in said basic block of instructions, determining which other instructions in said basic block of instructions said instruction depends on; and
   reordering said instruction in said basic block of instructions based on:
      how many other instructions said instruction depends on; and
      how many other instructions depend on said instruction.

8. A system for providing a cache memory that provides instructions to a processing unit, the system comprising:
   circuitry configured to receive a new instruction from a main memory;
   circuitry configured to determine whether said new instruction is a start of a basic block of instructions;
   circuitry configured to determine whether said basic block of instructions is stored in a cache memory;
   circuitry configured to retrieve said basic block of instructions from said main memory;
   circuitry configured to store said basic block of instructions in a new instruction block buffer;
   circuitry configured to reorder said basic block of instructions by:
      storing said basic block of instructions into a reorder buffer from said cache memory;
      performing an optimizing sequence process on said basic block of instructions in said reorder buffer;
      determining an optimal spatial location in said cache memory for said reordered instruction block; and
      storing said reordered instruction block to said optimal spatial location of said cache memory;
   circuitry configured to predict, from said basic block of instructions, a next basic block of instructions;
   circuitry configured to determine whether said next basic block of instructions is stored in said cache memory; and
   circuitry configured to retrieve said next basic block of instructions from said main memory.

9. The system of claim 8 further comprising:
   circuitry configured to halt reading of instructions in said instruction block from said main memory if said instruction block is stored in said cache memory.

10. The system of claim 9 further comprising:
    circuitry configured to provide said instructions of said basic block of instructions to said processor from said instruction block stored in said cache memory after said halting.

11. The system of claim 8 further comprising:
    circuitry configured to determine whether said basic block of instructions is unoptimized.

12. The system of claim 8 further comprising:
    circuitry configured to store said new instruction in said cache memory if said new instruction is not a start of an instruction block.

13. The system of claim 8 further comprising:
    circuitry configured to determine, prior to said predicting a next block of instructions, whether said block of instructions has previously been stored in said cache memory.

14. The system of claim 8, wherein said optimizing sequence process comprises:
    for each instruction in said basic block of instructions, determining which other instructions in said basic block of instructions said instruction depends on; and reordering said instruction in said basic block of instructions based on:
how many other instructions said instruction depends on; and
how many other instructions depend on said instruction.

* * * * *